(12) United States Patent
Baur et al.

(10) Patent No.: US 10,276,304 B2
(45) Date of Patent: Apr. 30, 2019

(54) POWER CAPACITOR UNIT FOR HIGH PRESSURE APPLICATIONS

(71) Applicant: ABB Schweiz AG, Baden (CH)

(72) Inventors: Matthias Baur, Baden (CH); Biswajit Singh, Ludvika (SE); Christoph Schlegel, Baden-Dattwil (CH); Esbjörn Eriksson, Rönninge (SE); Heinz Lendenmann, Västerås (SE); Moritz Boehm, Aargau (CH); Lise Donzel, Wettingen (CH); Felix Bandalo, Ludvika (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/781,344

(22) PCT Filed: Oct. 10, 2016

(86) PCT No.: PCT/EP2016/074188
§ 371 (c)(1),
(2) Date: Jun. 4, 2018

(87) PCT Pub. No.: WO2017/097460
PCT Pub. Date: Jun. 15, 2017

(65) Prior Publication Data
US 2018/0366271 A1 Dec. 20, 2018

(30) Foreign Application Priority Data
Dec. 9, 2015 (EP) .................................... 15198598

(51) Int. Cl.
H01G 2/16 (2006.01)
H01G 4/224 (2006.01)
(Continued)

(52) U.S. Cl.
CPC ............... *H01G 4/224* (2013.01); *H01G 4/04* (2013.01); *H01G 4/228* (2013.01); *H01G 4/38* (2013.01); *H02H 7/16* (2013.01)

(58) Field of Classification Search
CPC .................................. H01G 2/14; H01G 2/16
See application file for complete search history.

(56) References Cited

U.S. PATENT DOCUMENTS 3,579,061 A 5/1971 Waldon
4,442,473 A 4/1984 Holtzman et al.
(Continued)

FOREIGN PATENT DOCUMENTS

FR 2501412 A1 9/1982
JP 2002110026 A 4/2002

OTHER PUBLICATIONS

European Search Report Application No. 15198598.3 dated Feb. 19, 2016; Completed: Feb. 11, 2016 5 pages.
(Continued)

Primary Examiner — Eric W Thomas
(74) Attorney, Agent, or Firm — Whitmyer IP Group LLC

(57) ABSTRACT

A power capacitor unit for high-pressure applications is provided. The power capacitor unit includes a housing, a plurality of capacitor elements connected to each other and arranged inside the housing, a dielectric liquid (L), a solid electrical insulation system arranged to electrically insulate each capacitor element, a busbar, a plurality of fuse wires, each fuse wire having a first end connected to a respective capacitor element and a second end connected to the busbar (B), wherein the capacitor elements, the solid electrical insulation system, and the fuse wires are immersed in the dielectric liquid (L). Each fuse wire has a plurality of first sections that are in physical contact with the electrical insulation system, and wherein each fuse wire has a plurality (Continued)

of second sections without physical contact with the solid electrical insulation system.

18 Claims, 4 Drawing Sheets

(51) Int. Cl.
    *H01G 4/38*     (2006.01)
    *H02H 7/16*     (2006.01)
    *H01G 4/228*     (2006.01)
    *H01G 4/04*     (2006.01)

(56) References Cited

U.S. PATENT DOCUMENTS

| | | |
|---|---|---|
| 8,310,802 B2 | 11/2012 | Fujii et al. |
| 8,427,807 B2 | 4/2013 | Bo et al. |
| 9,035,739 B2 | 5/2015 | Boe et al. |
| 2005/0141164 A1 | 6/2005 | Bender et al. |
| 2016/0118187 A1* | 4/2016 | Ahn ............... H01G 2/16 361/301.4 |

OTHER PUBLICATIONS

International Search Report and Written Opinion of the International Searching Authority Application No. PCT/EP2016/074188 dated Nov. 14, 2016; Completed: Oct. 31, 2016 10 pages.

\* cited by examiner

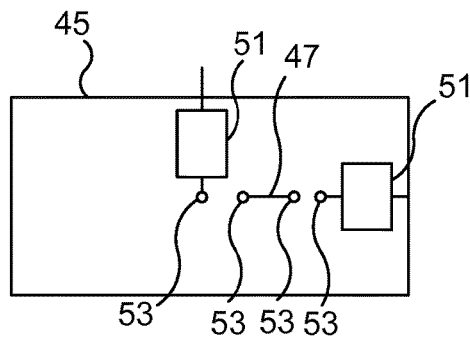
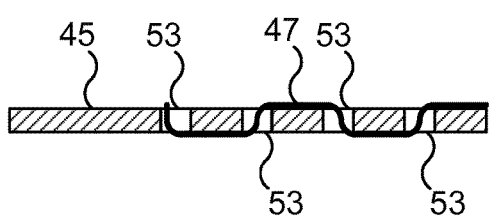
Fig. 3a              Fig. 3b
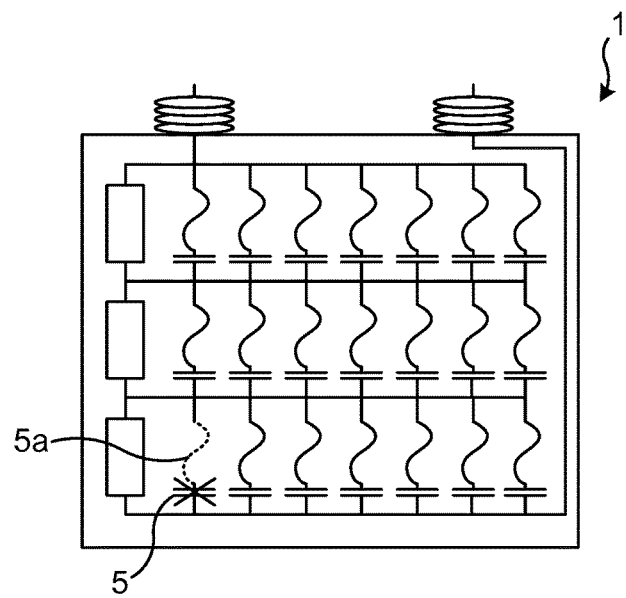
Fig. 4
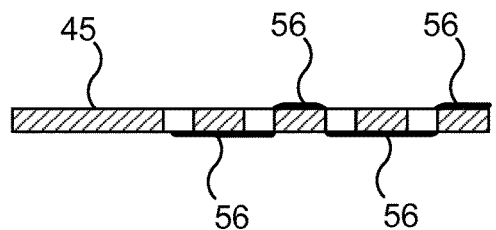
Fig. 5

POWER CAPACITOR UNIT FOR HIGH PRESSURE APPLICATIONS

TECHNICAL FIELD

The present disclosure generally relates to power capacitors for high pressure applications such as subsea applications.

BACKGROUND

Internally fused capacitors were developed to increase reliability of power capacitors. In this design every capacitor element of a power capacitor is connected through a fuse wire in series.

Capacitor elements consist of few layers of insulating film such as polypropylene, which is wound together with aluminium foil. The aluminium foils work as electrodes and the film layers work as dielectric. The film can have weak spots which over time can lead to a breakdown. In the case of a breakdown a high current flows though the failure point and welds the aluminium foils together such that there is a persistent short circuit in the element.

For an internally fused design at the event of a capacitor element failure, the capacitor elements connected in parallel discharge their energy to the short circuit through the fuse, which normally is enough to achieve a successful current limiting behaviour of the fuse. Current limiting behaviour means that the operated fuse can interrupt the discharge before all parallel energy is dumped into the short circuit spot. One important factor for this function is that the arc created by the operated fuse can expand and be cooled and extinguished by the surrounding insulating materials.

In case of a capacitor element failure, the large discharge current leads to the evaporation of the fuse and then to an arc inside the surrounding material which usually is a fluid such as oil. Due to the good cooling properties of oil, this arc is quenched within a few tens to hundreds of microseconds, leaving an electrical open circuit in-between the foot points where the fuse was connected to. As a consequence, the failing capacitor element is disconnected before damage is large enough to disturb functionality of the remaining capacitor elements.

SUMMARY

In recent years, there has been a growing interest in installing electrical equipment on the sea floor in depths from a few tens of meters to even kilometers. In subsea application power capacitors are installed at up to about 5000 meters below sea level, i.e. ambient pressures of up to about 500 bar.

It has been found by the present inventors that in case the interior of a power capacitor unit is pressurized to the hydrostatic pressure level on sea ground at such depths, the arc behaviour is different compared to atmospheric conditions. An open circuit after a current limiting operation can therefore not be guaranteed.

In view of the above, a general object of the present disclosure is to provide a power capacitor for high pressure applications, which reduces the risk of the establishment of a closed circuit to the fault in the event of a capacitor element failure.

There is hence provided a power capacitor unit for high-pressure applications, comprising: a housing, a plurality of capacitor elements connected to each other and arranged inside the housing, a dielectric liquid, a solid electrical insulation system arranged to electrically insulate each capacitor element, a busbar, a plurality of fuse wires, each fuse wire having a first end connected to a respective capacitor element and a second end connected to the busbar, wherein the capacitor elements, the solid electrical insulation system, and the fuse wires are immersed in the dielectric liquid, and wherein each fuse wire has a plurality of first sections that are in physical contact with the solid electrical insulation system, and wherein each fuse wire has a plurality of second sections without physical contact with the solid electrical insulation system.

The present inventors have observed that in high-pressure environments, a soot track, conductive residual after ionisation of material the fuse is made of, may form between the first end and the second end, or foot points, of a fuse wire after the fuse wire has been operated in the event of current limiting fuse operation. This soot track would provide a continuous current path to the faulty capacitor element. Such soot tracks do normally not occur under atmospheric conditions, since residuals are dispersed over much larger space so they do not build a conductive path between ends of the fuse.

By means of the fuse wires having a plurality of first sections that are in physical contact with the solid electrical insulation system and a plurality of second sections without physical contact with the solid electrical insulation system, the soot track formed in the event of current limiting would be discontinuous. This reduces the risk of the formation of a closed circuit in the event a fuse wire is operated during current limiting.

According to one embodiment the capacitor elements are stacked, and wherein each fuse wire is arranged between respective pairs of adjacent capacitor elements.

According to one embodiment each first section extends parallel with a respective surface of the solid electrical insulation system.

According to one embodiment each second section either extends parallel with a plane defined by a surface of the solid electrical insulation system or penetrates the solid electrical insulation system.

According to one embodiment the electrical insulation system includes a plurality of sets of holes, wherein each fuse wire extends along the solid electrical insulation system between a respective set of holes.

According to one embodiment for each fuse wire the first sections are those sections of the fuse wire which extend along the surface of the solid electrical insulation system, and the second sections are those sections of the fuse wire which cross a hole.

According to one embodiment the holes are through-holes and each fuse wire is woven through the respective set of through-holes such that each fuse wire extends alternatingly on opposite surfaces of the solid electrical insulation system.

According to one embodiment each fuse wire is arranged between two opposing surfaces of the solid electrical insulation system, wherein each opposing surface is provided with a respective set of holes, the holes of the opposing surfaces being aligned, and wherein each fuse wire extends across each hole of the corresponding two opposing surfaces.

According to one embodiment each hole has a varying cross-sectional area, the cross-sectional area of each hole increasing in a direction away from the fuse wire that extends across the hole.

According to one embodiment each fuse wire is laid out in one respective plane.

According to one embodiment the solid electrical insulation system includes a plurality of grating, wherein each fuse wire is laid out between two gratings.

According to one embodiment the solid electrical insulation system includes a plurality of nets, wherein each fuse wire is laid out between two nets.

According to one embodiment the solid electrical insulation system includes beads, which beads are threaded distanced from each other onto the fuse wires, wherein sections of the fuse wires that are in physical contact with the beads are the first sections and sections without physical contact with the beads are the second sections.

According to one embodiment the solid electrical insulation system has a surface roughness with elevated portions in physical contact with the fuse wires, wherein those sections of the fuse wires that are in physical contact with the elevated portions form the first sections of the fuse wires.

According to one embodiment the solid electrical insulation system includes encapsulation isolation, wherein the first sections of the fuse wires are encapsulated by the encapsulation insulation and wherein the second sections are non-encapsulated.

According to one embodiment the encapsulation insulation is one of the group of: lamination, coating and cement.

According to one embodiment the power capacitor unit is a subsea power capacitor unit.

One embodiment comprises a passive pressure compensator arranged to transmit ambient subsea pressure to the inside of the housing.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIGS. 3a and 3b show a first example of fuse wire arrangement of the power capacitor unit in FIG. 1;

FIG. 4 shows an example of a power capacitor unit with a capacitor element failure;

FIG. 5 shows the fuse wire arrangement in FIGS. 3a-b after a capacitor element failure;

FIG. 6b schematically shows a top view of the lower inter-element insulator and the fuse wire in FIG. 6a;

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

This disclosure relates to a power capacitor unit which includes a plurality of capacitor elements connected to each other.

Each capacitor element is connected to a respective fuse wire. A first end of each fuse wire is hence connected to a capacitor element, while the other end of the each fuse wire is connected to another fuse wire, via a busbar.

The capacitor elements may for example be of the film-foil type, where each capacitor element comprises conductive foils such as aluminium foils, and one or a multiple of dielectric film separating the conductive films. These films are placed on top of each other, wherein they are wound together creating a capacitor element.

The power capacitor unit furthermore includes a solid electrical insulation system. The solid electrical insulation system is arranged to electrically insulate each capacitor element. The solid electrical insulation system hence includes a plurality of inter-element insulators. An inter-element insulator refers to solid electrical insulation which encloses only one capacitor element.

The solid electrical insulation system is designed such that each fuse wire is alternatingly in physical contact with the solid electrical insulation system and without physical contact with the solid electrical insulation system. Each fuse wire has a plurality of first sections which are in physical contact with the solid electrical insulation system and a plurality of second sections which are without physical contact with the solid electrical insulation system.

Each first section extends parallel with and along a surface of the solid electrical insulation system, in particular along a surface of an inter-element insulator. Each second section either extends parallel with a plane defined by a surface of the solid electrical insulation system or penetrates the solid electrical insulation system, in particular an inter-element insulator. This design of the solid electrical insulation system reduces the risk of maintaining a closed circuit to a fault in the event of a capacitor element failure.

Figure 1:
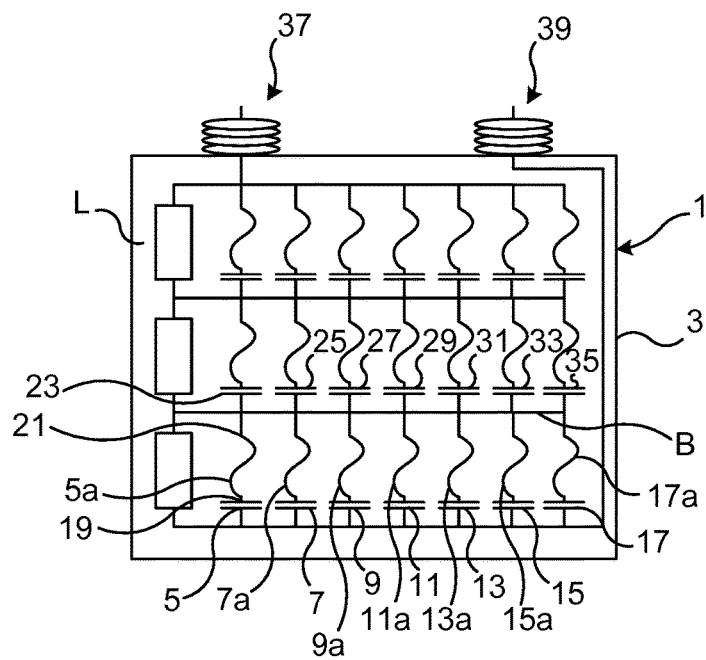
FIG. 1 schematically shows an example circuitry of a power capacitor unit.

FIG. 1 shows an example of a power capacitor unit 1. The power capacitor unit 1 has a housing 3. The housing may be made of a material which has high mechanical withstand strength, preferably metal such as steel.

According to one variation, the housing 1 includes a pressure compensator such as a passive pressure compensator. The pressure compensator is arranged to transmit ambient subsea pressure to the inside of the housing 3. Thereby a pressure difference between ambient subsea pressure and pressure inside the housing 3 may be reduced.

In the event of a passive pressure compensator, it may for example be defined by a mechanically flexible portion of the housing 3, or a membrane such as an impermeable membrane. The interior volume of the power capacitor unit 3 and thus the pressure inside the housing 3 is hence dependent of the ambient subsea pressure.

The power capacitor unit 1 furthermore comprises a plurality of capacitor elements 5-17, 23-35. Capacitor elements 5-17 are parallel connected, and so are capacitor elements 23-35.

The power capacitor unit 1 also comprises a plurality of fuse wires 5a-17a, protecting a respective one of the capacitor elements 5-17. There is hence a one-to-one correspondence in number between the capacitor elements 5-17 and the fuse wires 5a-17a contained in the power capacitor unit 1.

Each fuse wire 5a-17a has a first end 19 connected to a respective capacitor element 5-17. The power capacitor unit 1 also comprises a busbar B. Each fuse wire 5a-17a furthermore has a second end 21 connected to the busbar B. According to the example in FIG. 1, fuse wire 5a is connected to capacitor element 5 and to all of the remaining fuse wires 7a-17 a of the parallel connection through the busbar B.

Each fuse wire 5a-17a belonging to the group of parallel connected capacitor elements 5-17, a first group of parallel connected capacitor elements, may also be connected to a respective capacitor element 23-35 of a second group of parallel connected capacitor elements contained in the power capacitor unit 1. There may hence be several groups or assemblies of parallel connected capacitor elements. Each group or assembly is connected in series with another such group or assembly.

The terminals of the capacitor elements are connected with each other according to polarity such that a first terminal 37 and a second terminal 39 is formed, which are lead through the housing 3 to the exterior of the power capacitor unit 1.

Figure 2A:
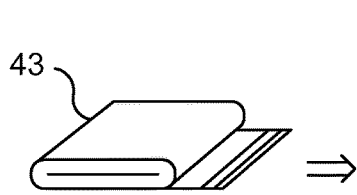
FIGS. 2a-2d schematically shows internal components and the general structure of a power capacitor unit of the type shown in FIG. 1.
Figure 2B:
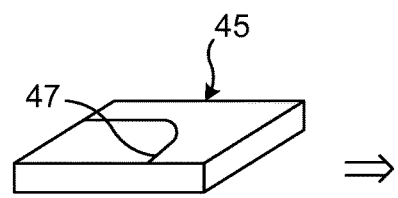
Figure 2C:
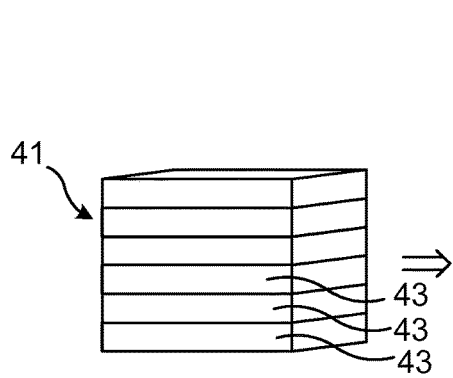
Figure 2D:
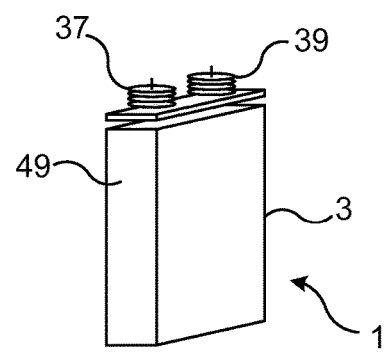

The power capacitor unit 1 also comprises a solid electrical insulation system 41, shown in FIG. 2c. The solid electrical insulation system 41 is arranged to electrically insulate the capacitor elements 5-35 from each other and from the internal walls of the housing 3. The solid electrical insulation system 41 may for example include components, e.g. inter-element insulators, made of a cellulose-based material.

The power capacitor unit 1 furthermore comprises a dielectric liquid L. The dielectric liquid L fills the entire empty interior space of housing 3 so as to prevent the occurrence of any air gaps between the internal surface of the housing 3 and the components contained therein. Due to its rather small compressibility, the dielectric liquid L counteracts deformation of the housing 3 when the power capacitor unit 1 is subjected to an ambient subsea pressure higher than a pressure that the housing 3 could withstand if it was filled with a high compressible material such as gas. The dielectric liquid L furthermore quenches arcs that may be generated in the event of a capacitor element failure. The dielectric liquid L may for example be oil or an ester.

FIGS. 2a-2d shows an example of the physical structure of the power capacitor unit 1. As briefly explained above, films of conductive material are wound together with an insulating material arranged between them, thus forming a capacitor element 43. The capacitor element 43 is then provided with an inter-element insulator 45 that forms part of the solid electrical insulation system 41, as shown in FIG. 2b.

A fuse wire 47 is lead from the capacitor element 43 along the inter-element insulator 45 for connection with another fuse wire. The electrically insulated capacitor elements 43 are stacked on top of each other thus forming the parallel connected and series connected assemblies of capacitor elements. The stacked capacitor elements 43 are then placed in the housing 3, and same polarity terminals are collected and lead out through the housing 3 forming the first terminal 37 and the second terminal 39. The power capacitor unit 1 is then filled with the dielectric liquid. By means of the pressure compensator 49 the power capacitor unit 1 can be pressurized to the suitable hydrostatic pressure level.

FIG. 3a shows a top view of a part of the solid electrical insulation system 41, namely an inter-element insulator 45. The inter-element insulator 45 includes a plurality of holes 53, which according to this example are through-holes. The fuse wire 47 is woven through the holes 53 such that the fuse wire 47 alternatingly extends along two opposite surfaces of the inter-element insulator 45, as shown in more detail in FIG. 3b which shows only a detail of a cross-section of one side of the inter-element insulator 45. The fuse wire 47 may for example be attached to the inter-element insulator 45 by means of pieces of tape 51.

FIG. 4 shows an example failure situation in the power capacitor unit 1. According to the example capacitor element 5 has been subjected to a failure, whereby the fuse wire 5a is operated by the fault current flowing to the fault.

FIG. 5 shows the part of the inter-element insulator 45 depicted in FIG. 3b after the fault. The fuse wire 47 has been operated, i.e. been evaporated, and a soot track 56 is formed on the opposite surfaces of the particular part of the solid electrical insulation system 41. As can be seen, the weaving of the fuse wire 47 results in that the there will be no continuous soot track upon evaporation of the fuse wire 47. The risk of failed open circuit through the failed capacitor element may thereby be reduced.

Figure 6A:
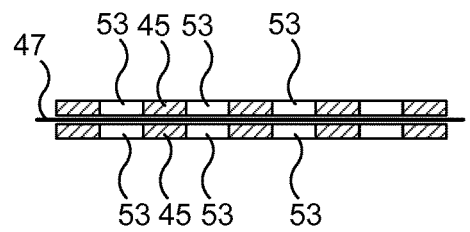
FIG. 6a schematically depicts a second example of a fuse wire arrangement.

FIG. 6a shows another example of a fuse wire arrangement. Here, the fuse wire 47 is arranged between two inter-element insulators 45. Only the top/bottom of each inter-element insulator 45 is shown in cross-section for the sake of clarity. Each of the two parts of the solid electrical insulation system comprises a plurality of holes 53, which may or may not be through-holes. There are hence two sets of holes 53 associated with each fuse wire 47, one provided in the upper inter-element insulator 45 and one in the lower inter-element insulator 45. It should here be noted that the terms "upper" and "lower" only refers to the orientation shown in FIG. 6a. Each hole 53 of the upper inter-element insulator 45 is aligned with a respective hole 53 of the lower inter-element insulator 45. The fuse wire 47 extends between and along the two opposing surfaces of the two inter-element insulators 45 and crosses each hole 53. The fuse wire 47 is hence laid over and extends across each hole 53. The holes 53 are filled with the dielectric liquid L.

Figure 6B:
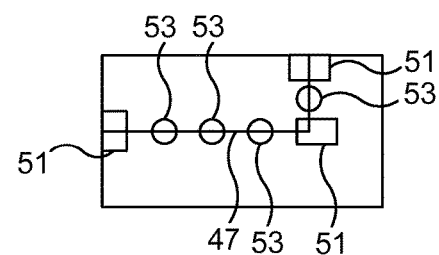

FIG. 6b shows a top-view of the fuse arrangement in FIG. 6a. The fuse wire 47 may be attached to the inter-element insulator 45 by means of for example tape 51.

Figure 6C:
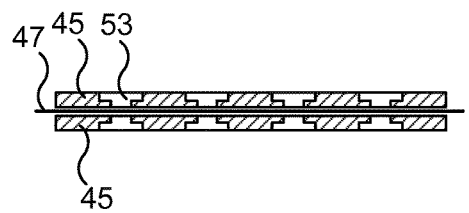
FIG. 6c schematically shows a third example of a fuse wire arrangement.

FIG. 6c shows another example of a fuse arrangement, similar to the one shown in FIGS. 6a and 6b. However, according to this example the holes 53, which may or may not be through-holes, have a varying cross-sectional area in a direction away from the fuse wire 47 laying across the holes 53. In case of through-holes, the cross-sectional area of each hole 53 is hence smaller in the proximity of the fuse wire 47 than on the opposite surface of this inter-element insulator 45. The cross-sectional dimensions of each hole 53 preferably increase in all radial directions, increasing the cross-sectional area in this manner. The cross-sectional area may for example increase in one or more discrete steps, creating a stair-like formation. Alternatively, the cross-sectional area could increase continuously.

The examples shown in FIGS. 6a-c function in the same manner as the example described with reference to FIGS. 3a-3b and FIG. 5. When the fuse wire 47 is operated, the soot track will be discontinuous, as part of the soot will be collected in the through-holes 53 and part of it will be spread on the facing surfaces of the inter-element insulators 45.

Figure 7A:
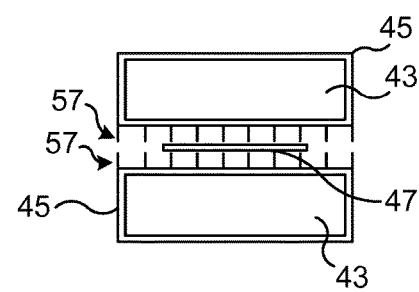
FIGS. 7a-b show a fourth example of a fuse wire arrangement.
Figure 7B:
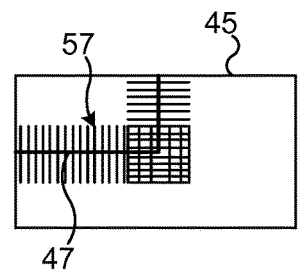

FIGS. 7a and 7b show another example of a fuse wire arrangement. According to this example, the electrical insulation system 41 comprises gratings 57 arranged on respective opposing surfaces of adjacent inter-element insulators 45. The fuse wire 47 is laid out between the two gratings 57.

Figure 8A:
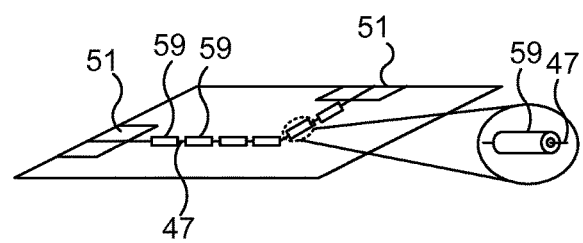
FIG. 8a shows a fifth example of a fuse wire arrangement.

FIG. 8a shows yet another example of a fuse wire arrangement. According to this example, the electrical insulation system 41 comprises a plurality of electrically insulating beads 59. Each fuse wire 47 is provided with a plurality of such beads 59 arranged one after the other with some distance between them. Each bead 59 is threaded onto a fuse wire 47 and arranged along a fuse wire 47 as the fuse wire 47 extends along the inter-element insulator 45. The fuse wire 47 may for example be attached to the inter-element insulator 45 by means of tape 51.

Figure 8B:
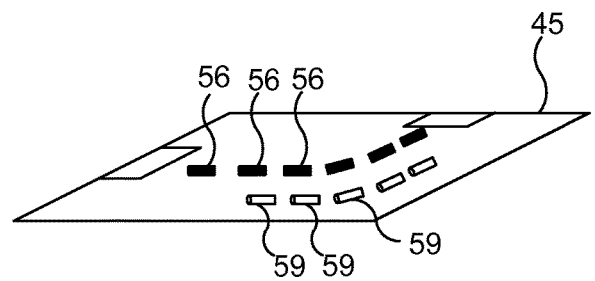
FIG. 8b shows the fuse wire arrangement in FIG. 8a following a capacitor element failure which results in the melting of the fuse wire.

FIG. 8b shows an example where the fuse wire 47 in FIG. 8a has been operated as a result of current limiting. A discontinuous soot track 56 is thus created, as some of the soot will be contained in the beads 59, which have moved around after the fuse wire 47 which held them together evaporated, and some soot will be located along sections between the original locations of the beads 59.

In another variation, the solid electrical insulation system includes encapsulation isolation. The fuse wires are in this case partially encapsulated with the encapsulation insulation. In particular, the fuse wires have been provided with sections with the encapsulation insulation and sections without the encapsulation insulation in an alternating manner. The encapsulation insulation may e.g. be a lamination of for example polymer films, a coating with enamel, or it may be cement. In this case, it may happen that the sections of fuse wire extending between the encapsulation insulation is in physical contact with the solid electrical insulation system, i.e. with an inter-element insulator.

Figure 9:
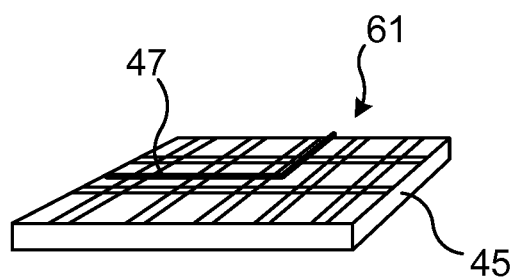
FIG. 9 shows a sixth example of a fuse wire arrangement.

FIG. 9 shows another example of a fuse wire arrangement. The inter-element insulator 45 is provided with a net 61 on which the fuse wire 47 is laid out. In this manner, there will again be no soot track in case the fuse wire 47 is operated during current limiting. Preferably, each fuse wire 47 is located between two inter-element insulators 45, between two nets.

Figure 10:
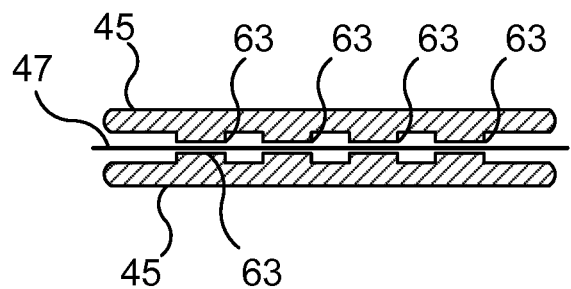
FIG. 10 shows a seventh example of a fuse wire arrangement.

FIG. 10 shows an example of a fuse wire arrangement where the inter-element insulator 45 has a surface roughness with elevated portions 63 in physical contact with a fuse wire 47. The elevated portions 63 preferably protrude at right angle or in another discontinuous manner relative to the recesses formed between the elevated portions. Preferably, these elevated portions are mirrored in adjacent inter-element insulators 45, between which a fuse wire 47 extends, to reduce the risk of a continuous soot track formation.

It is envisaged that the power capacitor unit presented herein find applications within high pressure applications such as subsea installations in the oil and gas industry, for example for subsea HVDC/HVAC power provision systems, i.e. power transmission and power distribution systems, offshore power generation such as wind energy, tidal energy, wave energy, and ocean current energy as well as variable speed drives for pumping or gas compression.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power capacitor unit for high-pressure applications, comprising:
a housing,
a plurality of capacitor elements connected to each other and arranged inside the housing,
a dielectric liquid,
a solid electrical insulation system arranged to electrically insulate each capacitor element,
a busbar, and
a plurality of fuse wires, each fuse wire having a first end connected to a respective capacitor element and a second end connected to the busbar,
wherein the capacitor elements, the solid electrical insulation system, and the fuse wires are immersed in the dielectric liquid, and
wherein each fuse wire (5a-17a, 47) has a plurality of first sections that are in physical contact with the solid electrical insulation system, and wherein each fuse wire has a plurality of second sections without physical contact with the solid electrical insulation system.

2. The power capacitor unit as claimed in claim 1, wherein the capacitor elements are stacked, and wherein each fuse wire is arranged between respective pairs of adjacent capacitor elements.

3. The power capacitor unit as claimed in claim 1, wherein each first section extends parallel with a respective surface of the solid electrical insulation system.

4. The power capacitor unit as claimed in claim 1, wherein each second section either extends parallel with a plane defined by a surface of the solid electrical insulation system or penetrates the solid electrical insulation system.

5. The power capacitor unit as claimed in claim 1, wherein the solid electrical insulation system includes a plurality of sets of holes, wherein each fuse wire extends along the solid electrical insulation system between a respective set of holes.

6. The power capacitor unit as claimed in claim 5, wherein for each fuse wire the first sections are those sections of the fuse wire which extend along the surface of the solid electrical insulation system, and the second sections are those sections of the fuse wire which cross a hole.

7. The power capacitor unit as claimed in claim 5, wherein the holes are through-holes and each fuse wire is woven through the respective set of through-holes such that each fuse wire extends alternatingly on opposite surfaces of the solid electrical insulation system.

8. The power capacitor unit as claimed in claim 5, wherein each fuse wire is arranged between two opposing surfaces of the solid electrical insulation system, wherein each opposing surface is provided with a respective set of holes, the holes of the opposing surfaces being aligned, and wherein each fuse wire extends across each hole of the corresponding two opposing surfaces.

9. The power capacitor unit as claimed in claim 8, wherein each hole has a varying cross-sectional area, the cross-sectional area of each hole increasing in a direction away from the fuse wire that extends across the hole.

10. The power capacitor unit as claimed in claim 8, wherein each fuse wire is laid out in one respective plane.

11. The power capacitor unit as claimed in claim 1, wherein the solid electrical insulation system includes a plurality of grating, wherein each fuse wire is laid out between two gratings.

12. The power capacitor unit as claimed in claim 1, wherein the solid electrical insulation system includes a plurality of nets, wherein each fuse wire is laid out between two nets.

13. The power capacitor unit as claimed in claim 1, wherein the solid electrical insulation system includes beads, which beads are threaded distanced from each other onto the fuse wires, wherein sections of the fuse wires that are in physical contact with the beads are the first sections and sections without physical contact with the beads are the second sections.

14. The power capacitor unit as claimed in claim 1, wherein the solid electrical insulation system has a surface roughness with elevated portions in physical contact with the fuse wires, wherein those sections of the fuse wires that are in physical contact with the elevated portions form the first sections of the fuse wires.

15. The power capacitor unit as claimed in claim 1, wherein the solid electrical insulation system includes encapsulation isolation, wherein the first sections of the fuse wires are encapsulated by the encapsulation insulation and wherein the second sections are non-encapsulated.

16. The power capacitor unit as claimed in claim 15, wherein the encapsulation insulation is one of the group of: lamination, coating and cement.

17. The power capacitor unit as claimed in claim 1, wherein the power capacitor unit is a subsea power capacitor unit.

18. The power capacitor unit as claimed in claim 17, comprising a passive pressure compensator arranged to transmit ambient subsea pressure to the inside of the housing.

* * * * *